United States Patent

Marui

[11] Patent Number: 5,299,467
[45] Date of Patent: Apr. 5, 1994

[54] APPARATUS FOR BINDING POST MEMBERS IN A BICYCLE

[75] Inventor: Kohei Marui, Kobe, Japan
[73] Assignee: Marui Co., Ltd., Kobe, Japan
[21] Appl. No.: 977,854
[22] Filed: Nov. 17, 1992
[30] Foreign Application Priority Data Nov. 20, 1991 [JP] Japan .................. 3-095269[U]

[51] Int. Cl.⁵ .................................. B62K 21/14
[52] U.S. Cl. .................... 74/551.1; 74/551.3; 280/279
[58] Field of Search ........... 74/551.1, 551.2, 551.3, 74/551.4; 280/276, 279

[56] References Cited

U.S. PATENT DOCUMENTS

| | | | |
|---|---|---|---|
| 3,936,076 | 2/1976 | Probst | 280/276 |
| 4,108,461 | 8/1978 | Hopper | 74/551.3 X |
| 4,354,399 | 10/1982 | Katayama | 74/551.1 |
| 4,939,950 | 7/1990 | Girvin | 74/551.1 X |
| 5,095,770 | 3/1992 | Rader | 280/279 X |

FOREIGN PATENT DOCUMENTS

| | | | |
|---|---|---|---|
| 132281 | 4/1949 | Australia | 280/279 |
| 44-9449 | 4/1969 | Japan | 74/551.1 |
| 57-91690 | 6/1982 | Japan | |
| 61-3743 | 2/1986 | Japan | |
| 688373 | 9/1979 | U.S.S.R. | 280/279 |
| 0713755 | 2/1980 | U.S.S.R. | 280/279 |
| 1497099 | 7/1989 | U.S.S.R. | 280/279 |
| 474652 | 11/1937 | United Kingdom | 280/279 |

*Primary Examiner*—Vinh T. Luong
*Attorney, Agent, or Firm*—Steven M. Rabin

[57] ABSTRACT

A bicycle having post couplings, e.g., a coupling of a handle post to a binding cylinder of a handle clamp, and a coupling of a seat post to a binding cylinder of a frame. The binding cylinder has an extension formed on a side of it. Two slanting holes perforate the extension in slanting directions toward the inner cylindrical opening of the binding cylinder. Two skew blocks are inserted into the respective slanting holes so that the ends touch the post member. The bolt penetrates bolt bores formed in the skew blocks. A nut is fitted to an end of the bolt and tightened. As the nut is tightened, the skew blocks move in the slanting direction of the holes to secure the post member. Since the direction of separation of the skew blocks deviates from that of the axis of the bolt, the friction between the blocks and the slanting holes resists vibrational forces tending to loosen the coupling.

17 Claims, 2 Drawing Sheets

APPARATUS FOR BINDING POST MEMBERS IN A BICYCLE

FIELD OF THE INVENTION

This invention relates to an apparatus for binding post members of a bicycle, e.g. a handle post, seat post, or a handle bar. The term "post member" as used herein means a vertical or horizontal pipe forming part of the skeletal structure of a bicycle.

BACKGROUND OF THE INVENTION

This application claims the priority of Japanese Utility Model Application No. 95269/1991, filed Nov. 20, 1991.

FIG. 4 exhibits a prior device for binding post members: a coupling of a handle post and second coupling of a handle bar. In FIG. 4, a handle post coupling 1 consists of a handle post 12 and a handle clamp 1a. The handle clamp 1a has an arm 13, a binding cylinder 11 for a handle bar A and a binding cylinder 10 for the handle post 12. A conventional coupling is now explained by describing the handle post coupling 1. The binding cylinder 10 of the clamp 1a has tightening ears 16, 16' which face each other with a small clearance 17. The tightening ears 16, 16' are perforated by holes extending a direction normal thereto. The handle post 12 is inserted into an inner hole of the binding cylinder 10. A bolt 14 penetrates the holes in the tightening ears 16, 16'. A nut 15 is engaged with an end of the bolt 14. Then, the nut 15 is tightened. The clearance 17 decreases. As a result, the inner surface of the binding cylinder 10 is strongly urged against the handle post 12. Therefore, the handle clamp 1a is tightly bound to the handle post 12 by the bolt 14 and the nut 15.

However, this binding structure suffers a drawback that the tightening force is gradually weakened by a loosening of the nut 15 from the bolt 14. In the conventional coupling, the direction of the tightening force produced by the bolt and nut, is the same as the direction of the axis of the bolt. Vibration accompanying the riding of the bicycle is likely to generate a force to loosen the bolt and nut. Since the force for loosening acts along a line parallel to the bolt, the bolt and nut are apt to loosen from each other. Coincidence of the direction of the bolt and the force of vibration is likely to result in a loosening of the hold of the bolt and nut to the cylinder 10.

The above describes an example of the loosening of the coupling of the handle post. A second coupling, of a seat post to a frame, has the same drawback. The loosening of couplings of post members must be prevented to obtain a stable structure of a bicycle.

A purpose of this invention is to provide a binding structure which can hold down the decrease of binding force brought about by loosening of a bolt and nut. Another purpose of the invention is to provide a binding structure which keeps a good hold between post members and other parts despite long term use of a bicycle.

SUMMARY OF THE INVENTION

The binding apparatus for post members of this invention comprises a binding cylinder having an opening formed at an end of a clamping member, an extension formed on the binding cylinder, a pair of slanting holes perforating the extension in such a direction that they meet at the opening of the binding cylinder, and a pair of skew blocks to be fitted in the slanting holes. The skew blocks are shorter than the lengths of the slanting holes. A bolt penetrates respective aligned bores in the skew blocks, and a nut tightens the bolt.

The function of the binding apparatus of the invention is now explained. A post member is inserted into the opening of the binding cylinder. Two skew blocks are inserted into the slanting holes of the extension of the binding cylinder. The bolt is inserted into the aligned bores. The nut is fitted on an end of the bolt. When the nut and bolt are tightened, the skew blocks approach each other, while sliding into the slanting holes. The inner ends of the skew blocks firmly engage the post member. In this state, the skew blocks are stably fixed in the slanting holes in the extension of the binding cylinder, by the tightening force of the bolt and nut. The skew blocks are fixed to the post member. Therefore, the post member is bound fast to the clamping member.

When vibration of a moving bicycle generates a force for loosening the coupling, forces are generated which urge the skew blocks toward positions held by the skew blocks before the tightening of the nut. Namely, the skew blocks would move in directions of separation. Since the holes keeping the skew blocks are slanting, the forces caused by random vibration of the bicycle would not really push the blocks in the directions of separation, because the forces tending to separate the skew blocks will be surely cancelled by the inner slanting walls of the slanting holes. As the bolt is not parallel with the center lines of the slanting holes, the reciprocal force in the directions of separation must act against the friction force in order to separate the skew blocks. But the friction force prevails over the separating force caused by vibration. The friction force is the sum of several partial friction forces, i.e., forces from first friction between the inner walls E, E' of the blocks and the outer surfaces F, F' of the post member, second friction between the inner-inclining walls G, G' of the slanting holes and the outer-inclining surfaces H, H' of the blocks, and third friction between the inner-inclining surfaces L, L' of the blocks and the outer-inclining walls M, M' of the slanting holes. Especially, the second friction between the inner-inclining walls of the slanting holes and the outer-inclining surfaces of the blocks will strongly resist separation of the skew blocks. The friction force will surpass the separating force generated by random vibration of the bicycle. The second friction would not occur, if the holes for holding the blocks were not slanting, and the bolt were parallel with the axial line of the holes. The second friction peculiar to this invention is in proportion to the product of the separating force and the sine of the slanting angle. Thus, if the slanting angle were zero non-slanting, the second friction would vanish. Therefore, the bolt and nut are unlikely to loosen despite random vibration of a bicycle. A firm hold between the post members and the binding cylinders is kept for a long time in a stable state.

DETAILED DESCRIPTION OF THE PREFERRED EMBODIMENT

An embodiment will be explained with reference to the several figures of the accompanying drawings.

Figure 1:
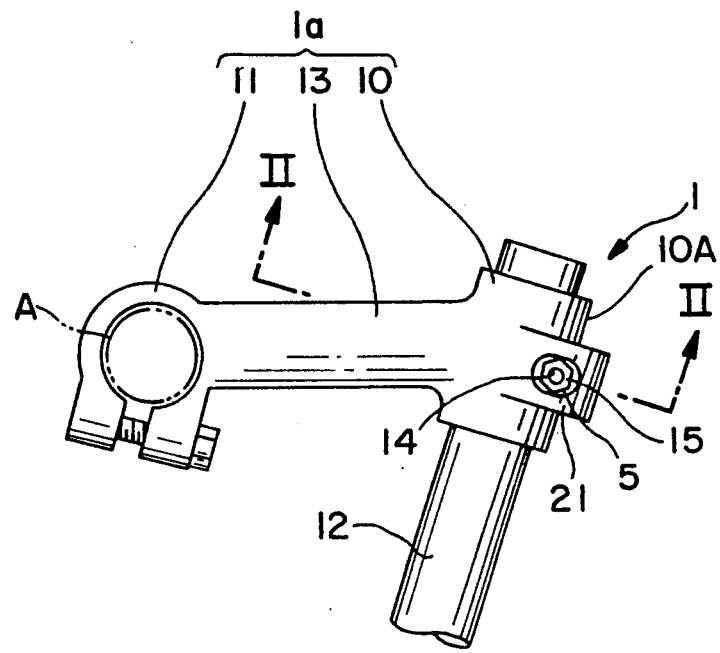
FIG. 1 is a side view of a binding apparatus according to an embodiment of this invention.
Figure 2:
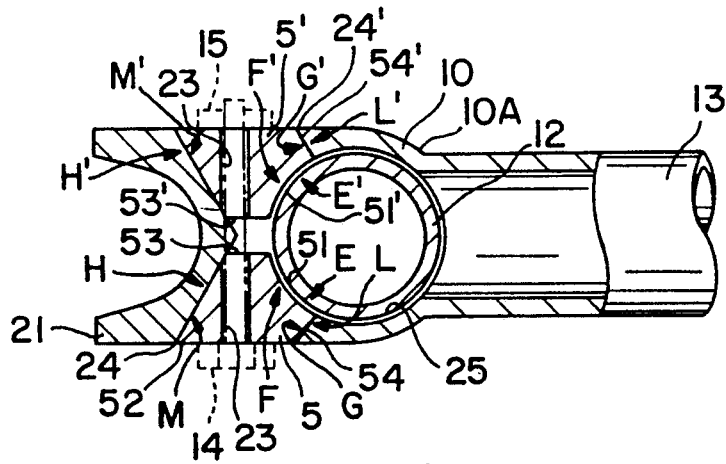
FIG. 2 is a sectional view taken along a line II—II of FIG. 1.

FIG. 1 shows an example of this invention applied to a handle post coupling for binding a handle post with a handle clamp. In FIG. 1, a handle post coupling 1 has a handle clamp 1a, a handle post 12, a bolt 14 and a nut 15. The handle clamp 1a consists of a post-binding cylinder 10 for coupling to the handle post 12, an arm 13 and a bar-binding cylinder 11 for coupling to a handle bar A. The bar-binding cylinder 11 has the same structure as the post-binding cylinder 10. Thus, the structure of the post-binding cylinder 10 is explained. The post-binding cylinder 10 has an opening 25 and an extension 21 which extends tangentially from the cylinder's cylindrical side surface. The extension has two slanting holes 24, 24' whose central axes are slanted to a normal to surfaces of the extension 21. The slanting holes incline toward the inner opening 25 of the binding cylinder 10. The two slanting holes are symmetric to each other relative to the central mirror plane which is parallel with, and equidistant from the surfaces of the extension 21, as shown in FIG. 2. Both slanting holes communicate with each other at their bottom ends inside the extension. The depth of each hole is half of the thickness of the extension 21. If necessary, a part of the wall of the holes is slightly eliminated for piercing a bolt 14.

Two skew blocks 5, 5' are inserted into the slanting holes 24, 24'. A bolt bore 23 perforates the blocks in the direction normal to the outer surface. The shape of the skew blocks 5, 5' is determined to fit in the slanting holes 24, 24'. But the thickness of each skew block 5, 5' is shorter than the depth of each respective slanting hole 24, 24'.

Figure 3:
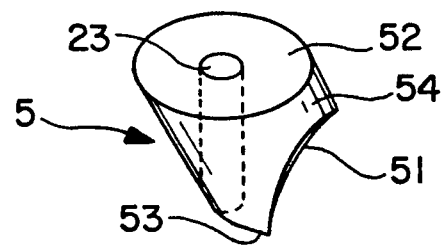
FIG. 3 is a perspective view of a skew block.
Figure 4:
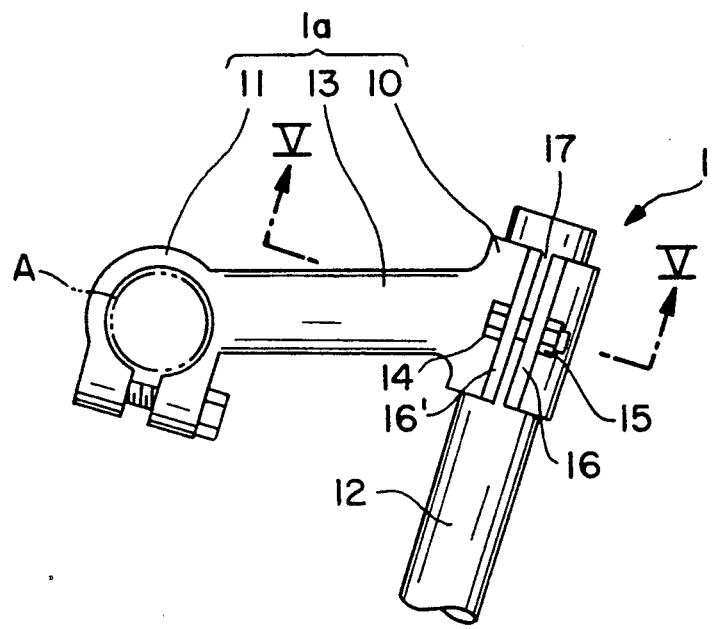
FIG. 4 is a side view of a conventional binding structure near a handle of a bicycle.
Figure 5:
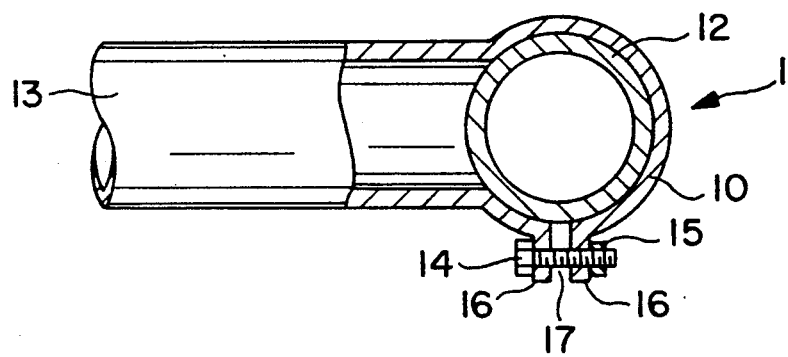
FIG. 5 is a sectional view taken along a line V—V of FIG. 4.

As illustrated in FIG. 3 and FIG. 2, the skew blocks 5, 5' have respective partial cylindrical surfaces 51, 51', slanting cylindrical surfaces 54, 54', outer flat surfaces 52, 52' and inner flat surfaces 53, 53'. The bolt 23, 23' are perpendicular to the outer flat surfaces 52, 52'. The curvature of the curved surfaces 51, 51' is the same as the curvature of the handle post 12. Since the intermediate cylindrical surface is slanting, the bottom inner ends of the bolt bores 23, 23' is spaced from the respective centers of the inner flat surfaces 53, 53', although the upper outer ends coincide with the centers of the outer flat surfaces 52, 52'. The inner flat surfaces 53, 53' are not necessarily parallel with the outer flat surfaces 52, 52'. When the skew blocks 5, 5' are put into the slanting holes 24, 24', the partial cylindrical surfaces 51, 51' are in contact with the handle post 12 and the outer flat surfaces 52, 52' are nearly at the same height as the surface of the extension 21. In this state, the bolt bores 23, 23' of the two blocks 5, 5' are aligned along a straight line.

Next, the operation for fitting the handle post 12 to the handle clamp 1a will be explained. The handle post 12 is inserted into the opening 25 of the post-binding cylinder 10. The two skew blocks 5, 5' are fitted into the respective slanting holes 24, 24'. The partial cylindrical surfaces 51, 51' contact the handle post 12. This contact automatically regulates the direction of the skew blocks 5, 5'. The outer flat surfaces 52, 52' of the skew blocks 5, 5' are aligned in the same planes as the respective side surfaces of the extension 21. In this state, the twp bolt bores 23, 23' lie straight along a line. The bolt 14 penetrates the bolt bores 23, 23'. The nut 15 is fitted on the bolt 14 and tightened. The skew blocks 5, 5' are pushed inward against the handle post 12 by the coupling of the bolt and nut.

Thus, the handle post 12 is firmly fixed to the handle clamp 1a. The direction of the movement of the skew blocks 5, 5' is different from the direction of the bolt by a certain angle B. Frictional forces act between the skew blocks and surfaces of the slanting holes and between the skew blocks and the handle post. The vibration of bicycle would loosen the coupling of the skew blocks 5, 5' from the slanting holes 23, 23'. However, the loosening force acts in the direction of the bolt 14. The loosening force is divided into a force normal to the wall of the slanting holes, and a sliding force which is parallel with the axis of the slanting holes. The vertical force is resisted by a string friction force against an actual slide of the skew blocks. If F denotes the unloosing force produced by the random vibration, the vertical force is $F \sin B$. The sliding force is $F \cos B$. If m denotes the direction coefficient, the resistance against the actual slide is $mF \sin B$. The net sliding force is $F \cos B - mF \sin B$. The outer friction between the handle post 12 and the partial cylindrical surfaces 51, 51' also resists against the actual slide. Thus, the skew blocks are surely restrained from being loosened. On the other hand, the sliding force is decreased by $F - F \cos B$. On the other hand, the frictional resistance to sliding, equal to $mF \sin B$, is generated. If the bolt were parallel with the guide holes of the blocks, as in the prior art, the sliding force would be F. Thus, the net sliding force $F \cos B - mF \sin B$ of this invention is much smaller than the sliding force F of the prior art.

The embodiment has been explained by showing an example of a handle post coupling. However, this invention can be widely applied to other binding devices, e.g. for a coupling between a handle bar and a handle clamp, a coupling between a seat post and a frame, or other couplings.

The operation of this invention comprises the steps of: first, inserting a post member into a cylinder, and next, inserting two skew blocks in slanting holes. But other orders of assembly are also available. Thus, first, two skew blocks are inserted into the slanting holes with a sufficient clearance at their ends; second, the skew blocks are tentatively coupled by a bolt and nut, and then the post member is inserted into the opening of the cylinder. Finally, the nut is tightened to fix the cylinder to the post member. The slanting angle B of the slanting holes and the skew blocks may have any arbitrary value other than $B = 0$. The most preferable slanting angle is 10 degrees to 30 degrees, but 4 degrees to 10 degrees or 30 degrees to 45 degrees are also available for the slanting angle.

What I claim is:

1. A binding apparatus of a bicycle comprising:
   a post member having a surface and being able to be coupled;
   a binding cylinder, said binding cylinder having an opening, the post member being inserts and fixed in the opening of the binding cylinder;
   an extension formed on a side of the binding cylinder;
   two slanting holes perforating the extension in a slanting direction toward the opening of the binding cylinder;
   two skew blocks, each skew block with a slanting cylindrical surface, a partial cylindrical surface which contacts the surface of the post member, an outer flat surface, an inner flat surface and a bolt bore, the bolt bore extending in a direction normal to the outer flat surface, the skew blocks being inserted into the slanting holes with a clearance between ends of the skew blocks;

a bolt penetrating the bolt bores; and a nut fitted to the bolt and being tightened to fix the skew blocks in the slanting holes, the nut and bolt pushing the skew blocks against the surface of the post member.

2. An apparatus as claimed in claim 1, wherein the partial cylindrical surface of each skew block has the same curvature as the surface of the post member and the partial cylindrical surface is in full contact with the outer surface of the post member when the skew blocks are pushed against the post member.

3. An apparatus as claimed in claim 2, wherein the bolt bores are aligned when the skew blocks are inserted into the slanting holes with the partial cylindrical surfaces thereof in contact with the post member, and the two skew blocks are bound by the bolt penetrating the bolt bores and the nut fitted to the bolt.

4. An apparatus as claimed in claim 3, including a handle clamp, wherein the binding cylinder is formed at an end of the handle clamp, the post member is a handle post, and the binding cylinder and the handle post construct a handle post coupling.

5. An apparatus as claimed in claim 3, including a handle clamp, wherein the binding cylinder is formed at an end of the handle clamp, the post member is a handle bar, and the binding cylinder and the handle bar construct a handle bar coupling.

6. An apparatus as claimed in claim 2, including a handle clamp, wherein the binding cylinder is formed at the end of the handle clamp, the post member is a handle post, and the binding cylinder and the handle post construct a handle post coupling.

7. An apparatus as claimed in claim 2, including a handle clamp wherein the binding cylinder is formed at an end of the handle clamp, the post member is a handle bar, and the binding cylinder and the handle bar construct a handle bar coupling.

8. An apparatus as claimed in claim 2, including a handle clamp, wherein the binding cylinder is formed at an end of the handle clamp, the post member is a handle bar, and the binding cylinder and the handle bar construct a handle bar coupling.

9. An apparatus as claimed in claim 1, wherein the bolt bores are aligned when the skew blocks are inserted into the slanting holes with the partial cylindrical surfaces thereof in contact with the post member, and the two skew blocks are bound by the bolt penetrating the bolt bores and the nut fitted to the bolt.

10. An apparatus as claimed in claim 9, including a handle clamp, wherein the binding cylinder is formed at an end of the handle clamp, the post member is a handle post, and the binding cylinder and the handle post construct a handle post coupling.

11. An apparatus as claimed in claim 9, including a handle clamp, wherein the binding cylinder is formed at an end of the handle clamp, the post member is a handle bar, and the binding cylinder and the handle bar construct a handle bar coupling.

12. An apparatus as claimed in claim 1, including a handle clamp, wherein the binding cylinder is formed at the end of the handle clamp, the post member is a handle post, and the binding cylinder and the handle post construct a handle post coupling.

13. An apparatus as claimed in claim 1 including a handle clamp wherein the binding cylinder is formed at an end of the handle clamp, the post member is a handle bar, and the binding cylinder and the handle bar construct a handle bar coupling.

14. An apparatus as claimed in claim 1, wherein the slanting holes are inclined to the direction of the bolt at an angle of 4 degrees to 45 degrees.

15. An apparatus as claimed in claim 1, wherein the slanting holes are inclined to the direction of the bolt at an angle of 10 degrees to 30 degrees.

16. An apparatus as claimed in claim 1, wherein the bolt bore in each skew block opens at a center of the outer flat surface and near a side of the inner flat surface, owing to the slanting cylindrical surface of each skew block.

17. A binding apparatus of a bicycle, comprising:

a binding cylinder having an opening;

a post inserted in the opening;

an extension on a side of the cylinder, the extension having respective interior surfaces defining two holes in opposite sides of the extension, the interior surfaces slanted to extend toward the opening in different first and second directions, so that the holes intersect the opening, and so that the holes intersect each other at an angle different from 180°;

two skew blocks, including a respective skew block inserted in each of the two holes, inward ends of the skew blocks being spaced from each other, each of the skew blocks having a slanting peripheral surface frictionally engaging the interior surface that defines the hole in which the skew block is provided, a post engaging surface, engaging the post peripheral surface, an outer surface, and a bore extending through the skew block in a third direction inclined to each of the first and second directions, the bore opening in the outer surface, the bores in the respective skew blocks being aligned with each other; and bolt and nut means, engaging the outer surfaces of the skew blocks, and extending through the bores of the skew blocks, said means tightened for urging the skew blocks toward each other and against the interior surfaces and the post peripheral surface, thereby to bind the post to the cylinder.

* * * * *